US006982636B1

(12) United States Patent
Bennie et al.

(10) Patent No.: US 6,982,636 B1
(45) Date of Patent: Jan. 3, 2006

(54) METHOD AND SYSTEM FOR MITIGATING FALSE ALARMS IN A TIRE PRESSURE MONITORING SYSTEM FOR AN AUTOMOTIVE VEHICLE

(75) Inventors: Brian Bennie, Sterling Heights, MI (US); Dilip B. Patel, Wixom, MI (US); Frederick James Porter, Farmington Hills, MI (US); Leena Shah, Bloomfield Township, MI (US); Thomas Michael McQuade, Ann Arbor, MI (US); Thomas Lee Miller, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,688

(22) Filed: Aug. 7, 2002

(51) Int. Cl.
B60C 23/00 (2006.01)
(52) U.S. Cl. .............. 340/442; 340/447; 340/539.1; 340/438; 340/443; 340/445; 73/146.5; 73/146.6; 73/146.7; 73/146.8; 73/143; 73/148
(58) Field of Classification Search .......... 340/442, 340/447, 539.1, 438, 443, 445; 73/146.5, 73/146.6, 146.7, 146.8, 143, 148
See application file for complete search history.

(56) References Cited

U.S. PATENT DOCUMENTS

| 1,948,427 A | 2/1934 | Moecker |
|---|---|---|
| 1,954,133 A | 4/1934 | Taylor |
| 2,274,557 A | 2/1942 | Morgan et al. |
| 2,578,358 A | 12/1951 | Jellison |
| 2,589,623 A | 3/1952 | Merritt et al. |
| 3,852,717 A | 12/1974 | Hosaka et al. |
| 3,911,855 A | 10/1975 | Haven |
| 3,965,847 A | 6/1976 | Deming |
| 3,974,477 A | 8/1976 | Hester |
| 4,051,803 A | 10/1977 | Arnone |
| 4,316,176 A | 2/1982 | Gee et al. |
| 4,376,931 A | 3/1983 | Komatu et al. |
| 4,443,785 A | 4/1984 | Speranza |
| 4,494,106 A | 1/1985 | Smith et al. |
| 4,510,484 A | 4/1985 | Snyder |
| 4,574,267 A | 3/1986 | Jones |
| 4,742,476 A | 5/1988 | Schwartz et al. |
| 5,061,917 A | 10/1991 | Higgs et al. |
| 5,109,213 A | 4/1992 | Williams |
| 5,463,374 A | 10/1995 | Mendez et al. |
| 5,517,853 A | 5/1996 | Chamussy |
| 5,569,848 A | 10/1996 | Sharp |
| 5,583,482 A | 12/1996 | Chamussy et al. |
| 5,587,698 A | 12/1996 | Genna |
| 5,589,815 A | 12/1996 | Nishihara et al. |
| 5,600,301 A | 2/1997 | Robinson, III |
| 5,602,524 A | 2/1997 | Mock et al. |
| 5,612,671 A | 3/1997 | Mendez et al. |
| 5,656,993 A | 8/1997 | Coulthard |

(Continued)

*Primary Examiner*—Tai T. Nguyen
(74) *Attorney, Agent, or Firm*—Gary Smith

(57) ABSTRACT

A pressure monitoring system (12) for a tire (14a) of an automotive vehicle includes a first pressure sensor (94) coupled to the wheel, a pressure transmitter (90) coupled to the pressure sensor (94) whereby the transmitter generates a pressure signal. A controller (22) is coupled to the pressure transmitter. The controller (22) receives the pressure signal and in a first stage, compares the pressure signal to a pressure threshold to obtain a sensor status. In a second stage, the controller (22) qualifies the sensor status signal by generating a warning status in response to the sensor status.

20 Claims, 13 Drawing Sheets

U.S. PATENT DOCUMENTS

| | | | |
|---|---|---|---|
| 5,661,651 A | 8/1997 | Geschke et al. | |
| 5,717,376 A | 2/1998 | Wilson | |
| 5,721,528 A | 2/1998 | Boesch et al. | |
| 5,741,966 A | 4/1998 | Handfield et al. | |
| 5,790,016 A | 8/1998 | Konchin et al. | |
| 5,801,306 A | 9/1998 | Chamussy et al. | |
| 5,808,190 A * | 9/1998 | Ernst | 73/146.5 |
| 5,838,229 A | 11/1998 | Robinson, III | |
| 5,853,020 A | 12/1998 | Widner | |
| 5,880,363 A | 3/1999 | Meyer et al. | |
| 5,913,240 A | 6/1999 | Drahne et al. | |
| 5,926,087 A | 7/1999 | Busch et al. | |
| 5,939,977 A | 8/1999 | Monson | |
| 5,959,202 A | 9/1999 | Nakajima | |
| 5,963,128 A | 10/1999 | McClelland | |
| 5,965,808 A | 10/1999 | Normann et al. | |
| 5,969,239 A | 10/1999 | Tromeur et al. | |
| 5,990,785 A | 11/1999 | Suda | |
| 5,999,091 A | 12/1999 | Wortham | |
| 6,002,327 A | 12/1999 | Boesch et al. | |
| 6,034,597 A | 3/2000 | Normann et al. | |
| 6,043,738 A | 3/2000 | Stewart et al. | |
| 6,046,672 A | 4/2000 | Pearman | |
| 6,078,252 A | 6/2000 | Kulczycki et al. | |
| 6,111,520 A | 8/2000 | Allen et al. | |
| 6,161,071 A | 12/2000 | Shuman et al. | |
| 6,199,575 B1 | 3/2001 | Widner | |
| 6,204,758 B1 | 3/2001 | Wacker et al. | |
| 6,218,936 B1 | 4/2001 | Imao | |
| 6,225,895 B1 | 5/2001 | Bigelow, Jr. | |
| 6,232,875 B1 | 5/2001 | DeZorzi | |
| 6,246,317 B1 | 6/2001 | Pickornik et al. | |
| 6,259,361 B1 | 7/2001 | Robillard et al. | |
| 6,271,748 B1 | 8/2001 | Derbyshire et al. | |
| 6,275,148 B1 * | 8/2001 | Takamura et al. | 340/442 |
| 6,275,231 B1 | 8/2001 | Obradovich | |
| 6,278,363 B1 * | 8/2001 | Bezek et al. | 340/442 |
| 6,278,379 B1 | 8/2001 | Allen et al. | |
| 6,292,096 B1 | 9/2001 | Munch et al. | |
| 6,293,147 B1 | 9/2001 | Parker et al. | |
| 6,327,570 B1 | 12/2001 | Stevens | |
| 6,339,736 B1 | 1/2002 | Moskowitz et al. | |
| 6,369,703 B1 * | 4/2002 | Lill | 340/447 |
| 6,385,511 B1 | 5/2002 | Fondeur et al. | |
| 6,446,502 B1 | 9/2002 | Normann et al. | |
| 6,448,891 B2 | 9/2002 | Barnett | |
| 6,448,892 B1 * | 9/2002 | Delaporte | 340/442 |
| 6,453,737 B2 * | 9/2002 | Young et al. | 73/146.5 |
| 6,463,798 B2 | 10/2002 | Niekerk et al. | |
| 6,498,967 B1 | 12/2002 | Hopkins et al. | |
| 6,518,876 B1 | 2/2003 | Marguet et al. | |
| 6,612,165 B2 * | 9/2003 | Juzswik et al. | 73/146.5 |
| 6,667,687 B1 * | 12/2003 | DeZorzi | 340/447 |
| 2001/0008083 A1 | 7/2001 | Brown | |
| 2002/0008718 A1 | 1/2002 | Obradovich | |

\* cited by examiner

| Flat Pressure | Low Pressure | High Pressure | Pressure Status |
|---|---|---|---|
| False | False | False | IN_RANGE |
| True | Don't Care | Don't Care | FLAT |
| False | True | Don't Care | LOW |
| False | False | True | HIGH |

FIG. 10

METHOD AND SYSTEM FOR MITIGATING FALSE ALARMS IN A TIRE PRESSURE MONITORING SYSTEM FOR AN AUTOMOTIVE VEHICLE

CROSS REFERENCE TO RELATED APPLICATIONS

The present invention is related to applications Ser. No. 10/064,693 entitled a "Method And System For Resetting Tire Pressure Monitoring System For An Automotive Vehicle"; Ser. No. 10/064,694 entitled "Method And System For Detecting The Presence Of A Spare Replacement In A Tire Pressure Monitoring System For An Automotive Vehicle"; Ser. No. 10/064,695 entitled "Method And System For Automatically Extending A Tire Pressure Monitoring System For An Automotive Vehicle To Include Auxiliary Tires"; Ser. No. 10/064,687 entitled "Method And System Of Notifying Of Overuse Of A Mini-Spare Tire In A Tire Pressure Monitoring System For An Automotive Vehicle"; Ser. No. 10/064,690 entitled "Method And Apparatus For Identifying The Location Of Pressure Sensors In A Tire Pressure Monitoring System"; Ser. No. 10/064,692 entitled "Tire Pressure Monitoring System With A Signal Initiator"; Ser. No. 10/064,691 entitled "Method And Apparatus For Automatically Identifying The Location Of Pressure Sensors In A Tire Pressure Monitoring System"; Ser. No. 10/065,468 entitled "Method And Apparatus For Reminding The Vehicle Operator To Refill The Spare Tire In A Tire Pressure Monitoring System"; filed simultaneously herewith and incorporated by reference herein.

BACKGROUND OF INVENTION

The present invention relates generally to a system for monitoring tire pressures in an automotive vehicle, and more particularly, to a method and system for monitoring the tire pressure system and prevent false warnings.

Various types of pressure sensing systems for monitoring the pressure within the tires of an automotive vehicle have been proposed. Such systems generate a pressure signal using an electromagnetic (EM) signal, which is transmitted to a receiver. The pressure signal corresponds to the pressure within the tire. When the tire pressure drops below a predetermined pressure, an indicator is used to signal the vehicle operator of the low pressure.

Various tire manufacturers have suggested various locations for the pressure sensors. Known systems include coupling a pressure sensor to the valve stem of the tire. Other known systems and proposed systems locate the pressure sensors in various locations within the tire wall or tread. Tires are mounted to wheels that are commonly made from steel or aluminum.

Signals from the pressure sensors are read by the system and a low pressure warning is generated when the pressure is below a predetermined threshold. Such system may not distinguish flat tires and high pressure situations. Also, a delay may be formed in such systems upon activation or reactivation of the system. Such delays are not desired in tire pressure monitoring systems because on start up of the system if a low tire pressure is present, it would be desirable to provide the driver with instant notification thereof.

It would therefore be desirable to provide the vehicle operator with timely information as to the presence of a low pressure, high pressure, or flat tire pressure situation in any of the tires of the vehicle.

SUMMARY OF INVENTION

The present invention provides a system and method for generating timely warnings to a vehicle operator as to the pressure of the tires. The present invention provides a two-stage determination. In the first stage, a sensor pressure status is obtained. In the second stage, the sensor pressure status is qualified and a warning status is generated.

In one aspect of the invention, a pressure monitoring system for a tire of an automotive vehicle includes a first pressure sensor coupled to the wheel, a transmitter coupled to the pressure sensor whereby the transmitter generates a pressure signal. A controller is coupled to the transmitter. The controller receives the pressure signal and in a first stage, compares the pressure signal to a pressure threshold to obtain a sensor status. In a second stage, the controller qualifies the sensor status signal by generating a warning status in response to the sensor status.

In a further aspect of the invention, a method of operating a pressure monitoring system comprises: transmitting a plurality of pressure signals from a tire pressure sensor, receiving said plurality of sequential pressure signals in a controller, in a first stage, comparing the plurality of pressure signals to a pressure threshold to obtain a plurality of pressure status signals, in a second stage, determining a warning status signal in response to said plurality of pressure status signals.

One advantage of the invention is that the system will quickly respond in a start up mode when a warning is detected to reduce the time associated with the warning to allow early remediation.

Other advantages and features of the present invention will become apparent when viewed in light of the detailed description of the preferred embodiment when taken in conjunction with the attached drawings and appended claims.

BRIEF DESCRIPTION OF DRAWINGS

FIG. 10 is a table summarizing the results obtained from the state diagrams illustrated in FIGS. 7, 8 and 9.

DETAILED DESCRIPTION

Figure 1:
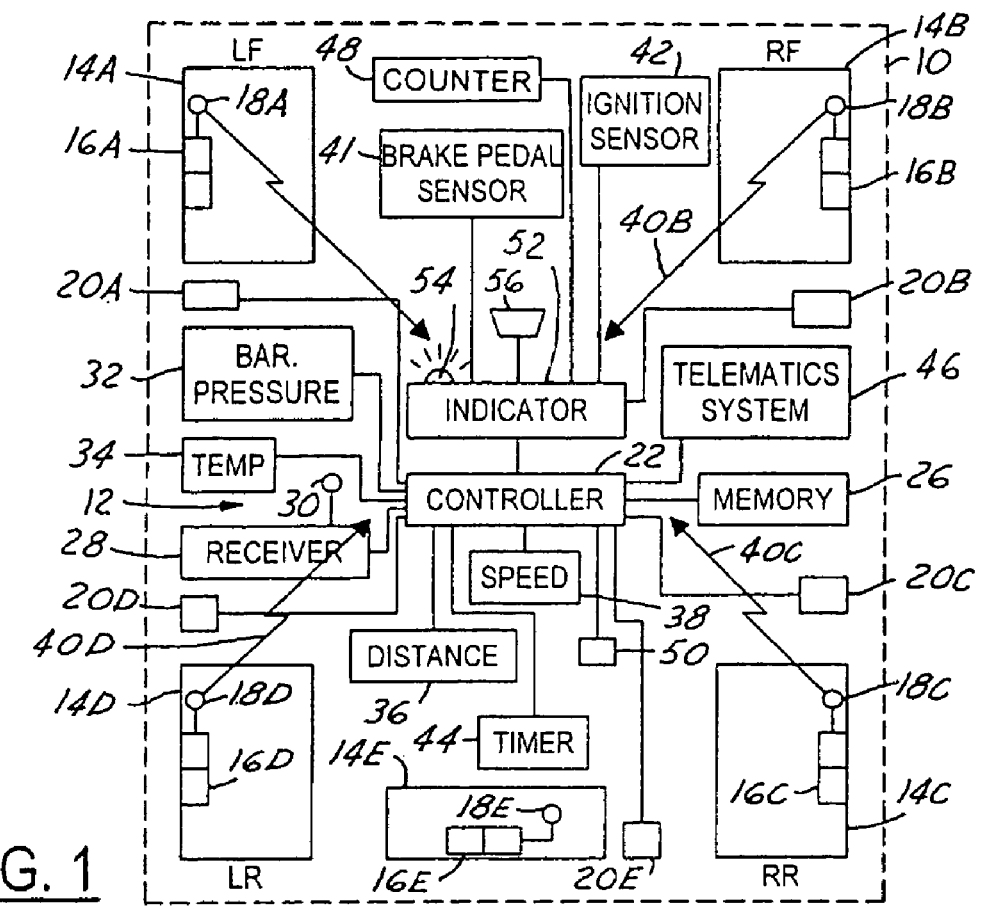
FIG. 1 is a block diagrammatic view of a pressure monitoring system according to the present invention.

In the following figures, the same reference numerals will be used to illustrate the same components. Those skilled in the art will recognize that the various components set forth herein could be changed without varying from the scope of the invention.

Referring now to FIG. 1, an automotive vehicle 10 has a pressure monitoring system 12 for monitoring the air pressure within a left front tire 14a, a right front tire 14b, a right rear tire 14c, and a left rear tire 14d. Each tire 14a–14d has a respective tire pressure sensor circuit 16a, 16b, 16c, and 16d, each of which has a respective antenna 18a, 18b, 18c, and 18d. Each tire is positioned upon a corresponding wheel.

A fifth tire or spare tire 14e is also illustrated having a tire pressure sensor circuit 16e and a respective antenna 18e. Although five wheels are illustrated, the pressure of various numbers of wheels may be increased. For example, the present invention applies equally to vehicles such as pickup trucks that have dual wheels for each rear wheel. Also, various numbers of wheels may be used in a heavy duty truck application having dual wheels at a number of locations. Further, the present invention is also applicable to trailers and extra spares as will be further described below.

Each tire 14 may have a respective initiator 20a–20e positioned within the wheel wells adjacent to the tire 14. Initiator 20 generates a low frequency RF signal initiator and is used to initiate a response from each wheel so that the position of each wheel may be recognized automatically by the pressure monitoring system 12. Initiators 20a–20e are preferably coupled directly to a controller 22. In commercial embodiments where the position programming is done manually, the initiators may be eliminated.

Controller 22 is preferably a microprocessor based controller having a programmable CPU that may be programmed to perform various functions and processes including those set forth herein.

Controller 22 has a memory 26 associated therewith. Memory 26 may be various types of memory including ROM or RAM. Memory 26 is illustrated as a separate component. However, those skilled in the art will recognize controller 22 may have memory 26 therein. Memory 26 is used to store various thresholds, calibrations, tire characteristics, wheel characteristics, serial numbers, conversion factors, temperature probes, spare tire operating parameters, and other values needed in the calculation, calibration and operation of the pressure monitoring system 12. For example, memory may contain a table that includes the sensor identification thereof. Also, the warning statuses of each of the tires may also be stored within the table.

Controller 22 is also coupled to a receiver 28. Although receiver 28 is illustrated as a separate component, receiver 28 may also be included within controller 22. Receiver 28 has an antenna 30 associated therewith. Receiver 30 is used to receive pressure and various information from tire pressure circuits 16a–16e. Controller 22 is also coupled to a plurality of sensors. Such sensors may include a barometric pressure sensor 32, an ambient temperature sensor 34, a distance sensor 36, a speed sensor 38, a brake pedal sensor 40, and an ignition sensor 42. Of course, various other types of sensors may be used. Barometric pressure sensor 32 generates a barometric pressure signal corresponding to the ambient barometric pressure. The barometric pressure may be measured directly, calculated, or inferred from various sensor outputs. The barometric pressure compensation is preferably used but is not required in calculation for determining the pressure within each tire 14. Temperature sensor 34 generates an ambient temperature signal corresponding to the ambient temperature and may be used to generate a temperature profile.

Distance sensor 36 may be one of a variety of sensors or combinations of sensors to determine the distance traveled for the automotive vehicle. The distance traveled may merely be obtained from another vehicle system either directly or by monitoring the velocity together with a timer 44 to obtain a rough idea of distance traveled. Speed sensor 38 may be a variety of speed sensing sources commonly used in automotive vehicles such as a two wheel used in anti-lock braking systems, or a transmission sensor.

Timer 44 may also be used to measure various times associated with the process set forth herein. The timer 44, for example, may measure the time the spare tire is stowed, or measure a time after an initiator signal.

Brake pedal sensor 41 may generate a brake-on or brake-off signal indicating that the brake pedal is being depressed or not depressed, respectively. Brake pedal sensor 41 may be useful in various applications such as the programming or calibrating of the pressure monitoring system 12.

Ignition sensor 42 may be one of a variety of types of sensors to determine if the ignition is powered on. When the ignition is on, a run signal may be generated. When the ignition is off, an off signal is generated. A simple ignition switch may act as an ignition sensor 42. Of course, sensing the voltage on a particular control line may also provide an indication of whether the ignition is activated. Preferably, pressure monitoring system 12 may not be powered when the ignition is off. However, in one constructed embodiment, the system receives information about once an hour after the ignition has been turned off.

A telemetric system 46 may be used to communicate various information to and from a central location from a vehicle. For example, the control location may keep track of service intervals and use and inform the vehicle operator service is required.

A counter 48 may also be included in control system 12. Counter 48 may count, for example, the number of times a particular action is performed. For example, counter 48 may be used to count the number of key-off to key-on transitions. Of course, the counting function may be inherent in controller 22.

Controller 22 may also be coupled to a button 50 or plurality of buttons 50 for inputting various information, resetting the controller 22, or various other functions as will be evident to those skilled in the art through the following description.

Controller 22 may also be coupled to an indicator 52. Indicator 52 may include an indicator light or display panel 54, which generates a visual signal, or an audible device 56 such as a speaker or buzzer that generates an audible signal. Indicator 52 may provide some indication as to the operability of the system such as confirming receipt of a signal such as a calibration signal or other commands, warnings, and controls as will be further described below. Indicator may be an LED or LCD panel used to provide commands to the vehicle operator when manual calibrations are performed.

Figure 2:
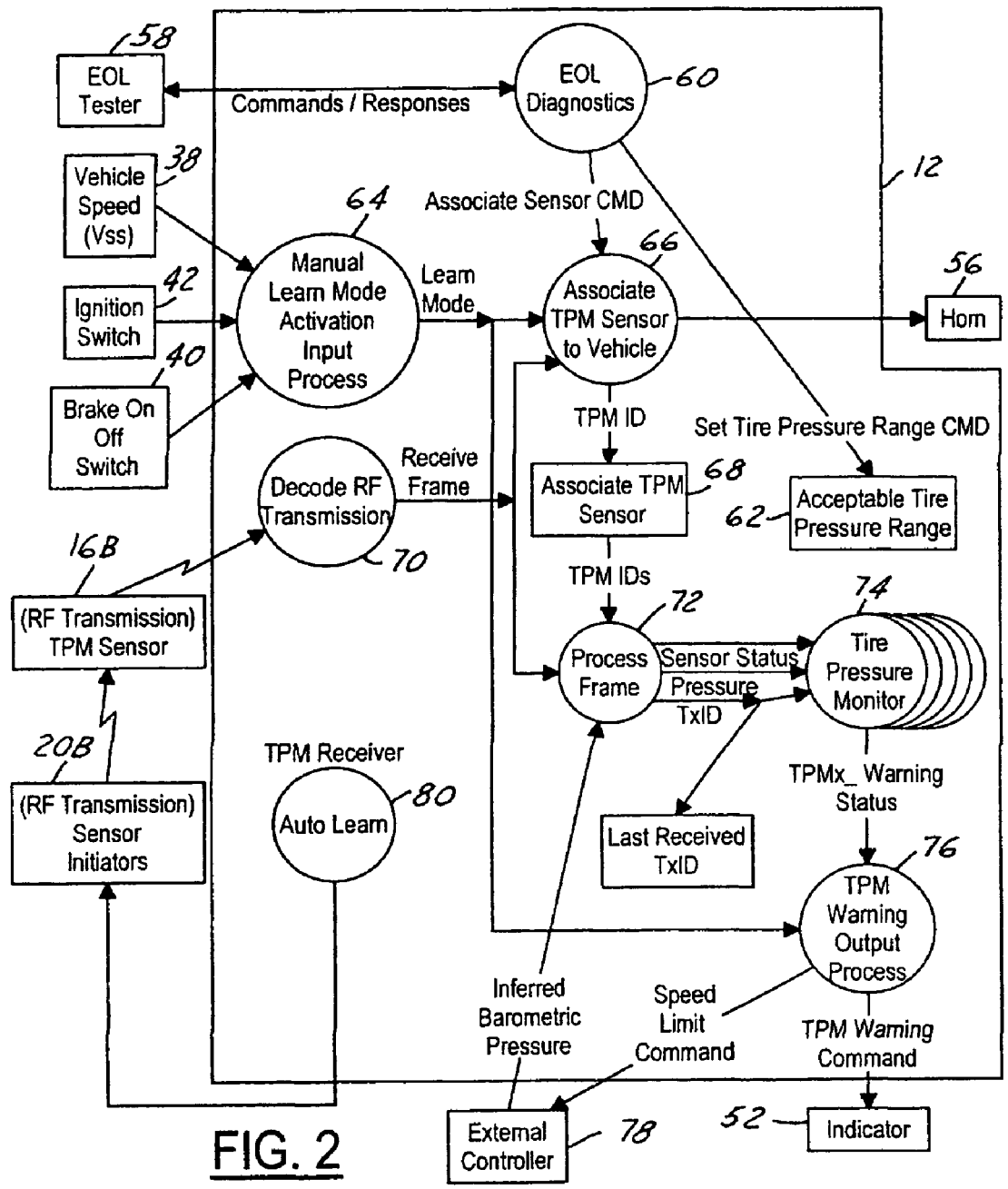
FIG. 2 is a functional flowchart of the monitoring system according to the present invention.

Referring now to FIG. 2, a pressure monitoring system 12 having various functional blocks is illustrated. These functional blocks may take place within receiver 28, controller 22, or a combination thereof. Also, memory 26 is used to store the various ranges. An end-of-line (EOL) tester 58 may also be coupled to pressure monitoring system. EOL tester 58 provides test functions to EOL diagnostic block 60. EOL tester 58 in conjunction with EOL diagnostic block 60 may be used to provide acceptable pressure ranges 62 and other diagnostic functions to determine fault within the system. The EOL tester 58 may be used in the manufacturing process to store various information in the memory such as various thresholds, tire characteristics, and to initially program the locations corresponding to the vehicle tires.

Vehicle speed sensor 38, ignition switch 42, and brake on/off switch 41 may be coupled to a manual learn mode activation input process block 64. Together block 64 and sensors 38, 41, and 42 allow an association block 66 to associate the various tire pressure sensors to the locations of the vehicles. Block 66 associates the various tire pressure sensors in the memory at block 68. The transmissions from the various sensors are decoded in block 70, which may be performed in receiver 28 above. The decoded information is provided to block 66 and to a block 72, which processes the various information such as the ranges, the various sensor locations, and the current transmission process. In the processing frame the sensor status pressure and transmission ID may be linked to a tire pressure monitor 74 which may be used to provide a warning status to an output block 76 which in turn may provide information to an external controller 78 and to indicator 52.

An auto learn block 80 may also be used to associate the various tire pressure sensor monitors with the locations of the tires in the vehicle. This process may replace or be in addition to the manual learn block 64. The auto learn function, however, uses initiators such as the initiator 20b as shown. The various features of FIG. 2 will be described further in more detail.

Figure 3:
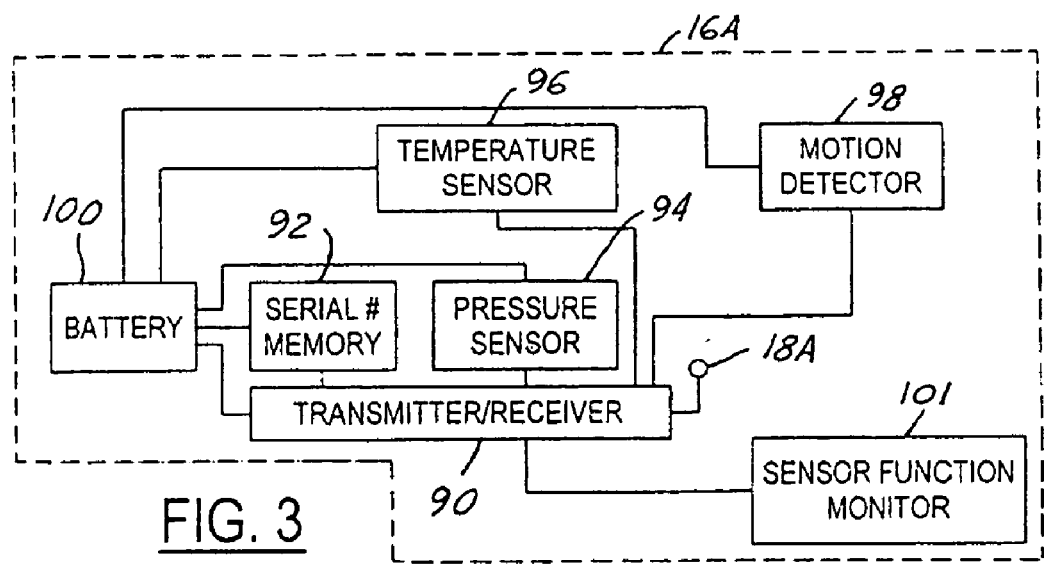
FIG. 3 is a block diagrammatic view of a pressure transmitter according to the present invention.

Referring now to FIG. 3, a typical tire pressure sensor circuit 16a is illustrated. Although only one tire pressure sensor circuit 16 is shown, each may be commonly configured. Pressure monitoring system 12 has a transmitter/receiver or transceiver 90. Transmitter/receiver 90 is coupled to antenna 18a for transmitting various information to receiver 28. The receiver portion may be used to receive an activation signal for an initiator located at each wheel. The pressure sensor may have various information such as a serial number memory 92, a pressure sensor 94 for determining the pressure within the tire, a temperature sensor 96 for determining the temperature within the tire, and a motion detector 98 which may be used to activate the system pressure sensing system. The initial message is referred to as a "wake" message, meaning the pressure sensing circuit is now activated to send its pressure transmissions and the other data.

Each of the transceiver 90, serial number memory 92, pressure sensor 94, temperature sensor 96, and motion sensor 98 coupled to battery 100. Battery 100 is preferably a long-life battery capable of lasting through the life of the tire.

A sensor function monitor 101 may also be incorporated into tire pressure sensor circuit 16. Sensor function monitor 101 generates an error signal when various portions of the tire pressure circuit are not operating or are operating incorrectly. Also, sensor function monitor may generate a signal indicating that the circuit 16 is operating normally.

Figure 4:
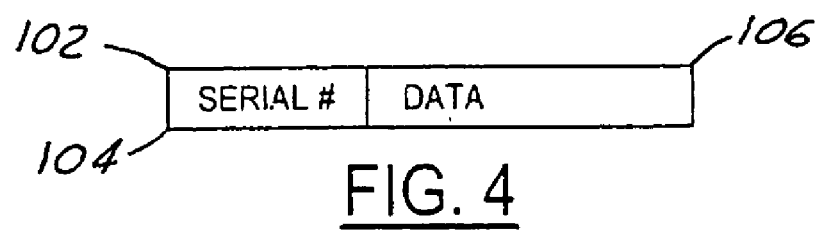
FIG. 4 is a diagrammatic view of a digital word from a pressure transmitter.

Referring now also to FIG. 4, a word 102 generated by the tire pressure sensor circuit 16 of FIG. 3 is illustrated. Word 102 may comprise a transmitter identification serial number portion 104 followed by a data portion 106 in a predetermined format. For example, data section 106 may include a wake or initial status pressure information followed by temperature information. Motion detector 28 may initiate the transmission of the word 102 to the transmitter/receiver 90. The word 102 is preferably such that the decode RF transmission block 70 is able to decode the information and validate the word while providing the identification number or serial number, the pressure, the temperature, and a sensor function.

Figure 5:
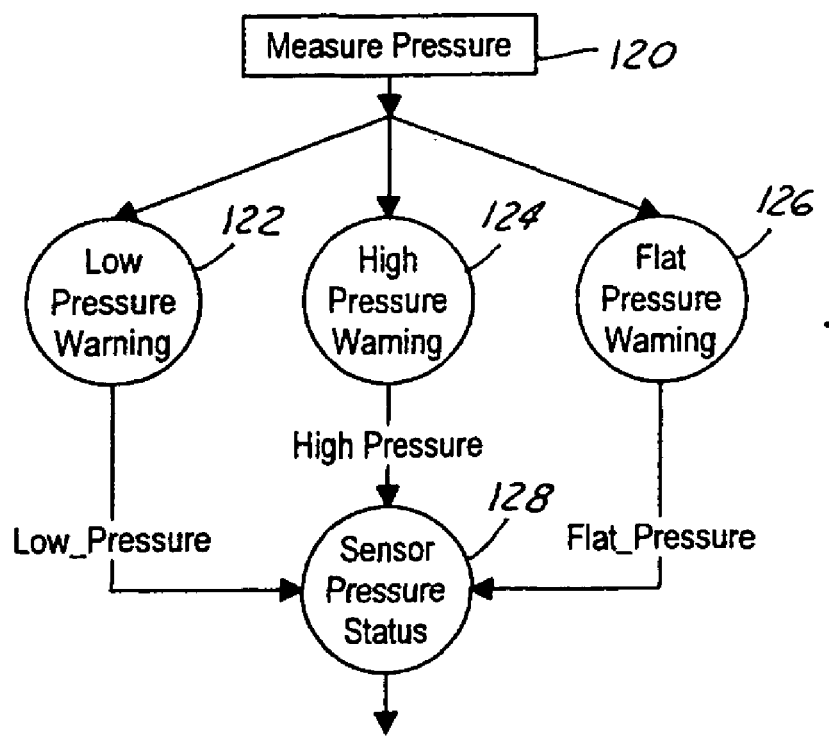
FIG. 5 is a flow chart illustrating determining a pressure status in a first stage of pressure determination according to the present invention.

Referring now to FIG. 5, a high level flow chart illustrating obtaining a sensor pressure status from the measured pressure is illustrated. The pressure status is determined in a similar manner for each of the tires on the vehicle. In block 120 the pressure is measured at the pressure sensor and transmitted to the receiver and is ultimately used in the controller. The pressure measured is compared to a low pressure threshold and a low pressure warning is generated if the measured pressure is below the low pressure threshold. In block 124 if the measured pressure is above the high pressure warning, then a high pressure warning is generated. In block 126 if the measured pressure is below a flat pressure, then a flat pressure warning is generated. In block 128 the pressure status is obtained from blocks 122, 124, and 126. The sensor pressure status is a first stage of pressure monitoring according to the present invention.

Figure 6:
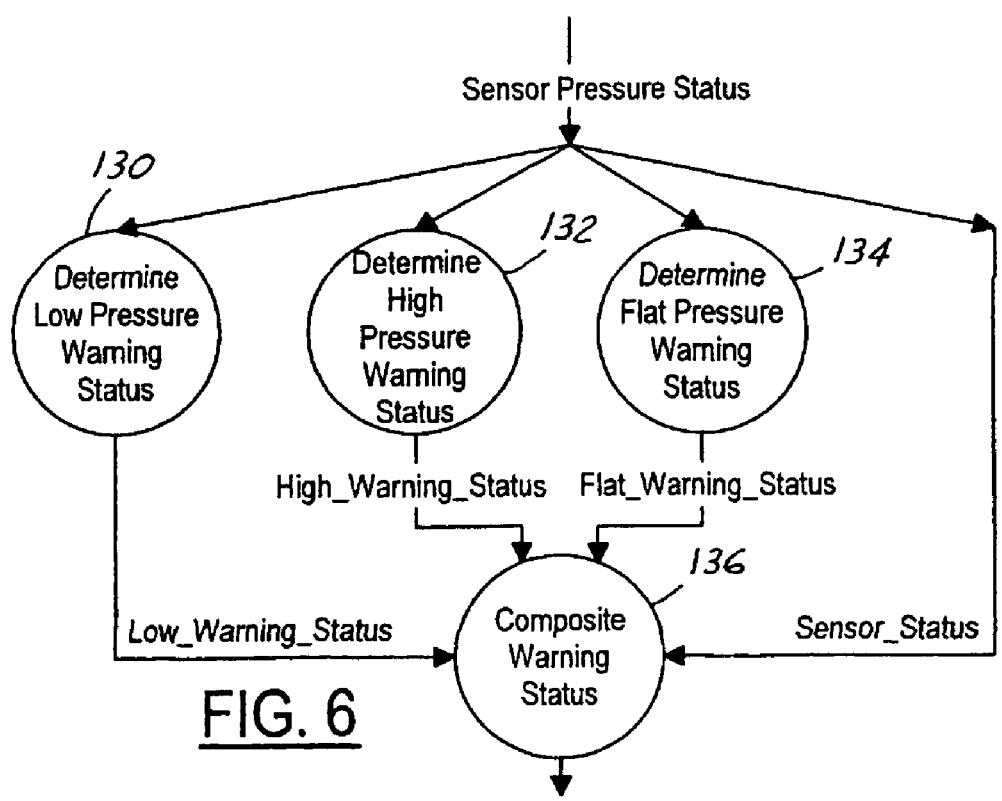
FIG. 6 is a flow chart illustrating determining a warning status in a second stage of pressure determination according to the present invention.

Referring now to FIG. 6, a second stage of pressure monitoring is illustrated in a high level flow chart view. Once the sensor pressure status is obtained in block 128 of FIG. 5, a low pressure warning status, a high pressure warning status, a flat pressure warning status, and an overall sensor status is used to form a composite warning status. In block 130 the low pressure warning status is determined. In block 132 the high pressure warning status is determined. In block 134 a flat pressure warning status is determined. As will be further described below, preferably several measurements take place during normal operation to confirm the status. Each of the low pressure warning status, high pressure warning status, and flat pressure warning status are combined together to form the composite warning status in block 136. The low pressure warning status, the high pressure warning status, and the flat pressure warning status may have two statuses indicative of a warning state indicating the conditions are not met and a not warning state indicating the conditions are not met.

Figure 7:
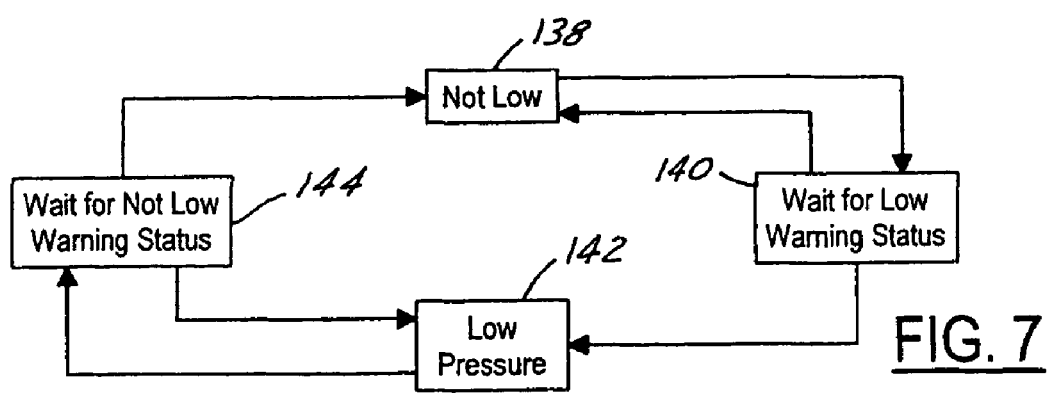
FIG. 7 is a state diagram of low pressure sensor status according to the present invention.

Referring now to FIG. 7, a state diagram for determining the sensor pressure status is illustrated. Block 138 corresponds to a not low sensor status. In the following example, both the front tire pressure and the rear tire pressure may have different threshold values. Also, the spare tire may also have its own threshold values. When any of the tires is below its low pressure threshold and a warning status is not low, block 140 is performed. Of course, those in the art will recognize that some hysteresis may be built into the system so that not exactly the same thresholds may be used to transition back. In block 140 the low warning status is determined in the second stage as will be described below. In block 140 when the warning status is not low and the sensor is equal to or above the threshold for the tire, then the sensor pressure status is not low and the system returns to block 138. In block 140 when a low warning status is determined, then block 142 is performed. In block 142 when the pressure is greater than or equal to the threshold pressure of the associated tire, then block 144 is performed. In block 144 a "not low" warning status is determined as will be further described below. When the tire pressures are less than their associated low thresholds, then block 142 is executed. In block 144 when a warning status of not low is determined, block 138 is executed. Blocks 138 through 144 illustrate a continuous loop in which the sensor readings are monitored and a sensor pressure status and warning status are used to move therethrough.

Figure 8:
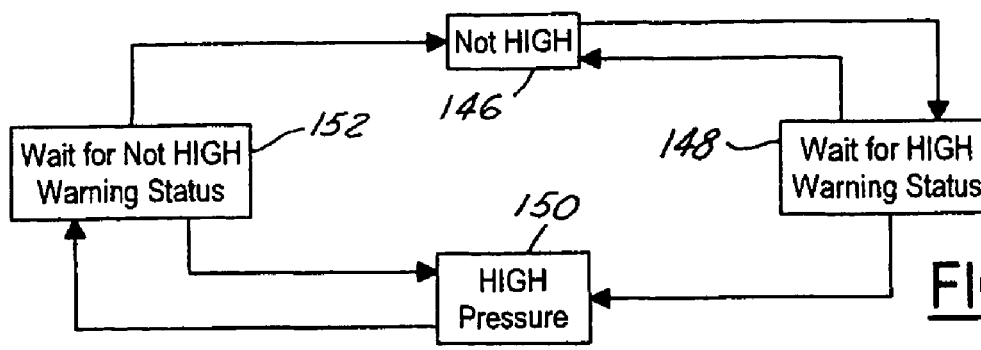
FIG. 8 is a state diagram of high pressure sensor status according to the present invention.

Referring now to FIG. 8, a similar state diagram to that of FIG. 7 is illustrated relative to a high pressure threshold. In block 146 the warning status is not high. To move from block 146 to 148 the pressure of the particular tire exceeds a high pressure threshold. When the pressure reading exceeds one of the high pressure thresholds for one of the tires, block 148 determines a high warning status. A high warning status is determined as will be further described below. When subsequent readings of the pressure sensor are lower than or equal to the high pressure threshold, then block 146 is again executed. In block 148 if the high warning status criteria are met, a high warning status is generated and block 150 is executed. Again, the thresholds may be offset slightly to provide hysteresis. In block 150 when the pressure reading drops below a high pressure threshold then block 144 is executed. If subsequent readings are greater than the high pressure threshold then block 150 is again executed. In block 152 when the not high warning status criteria are met, as will be further described below, a not high warning status is generated and block 146 is again executed.

Figure 9:
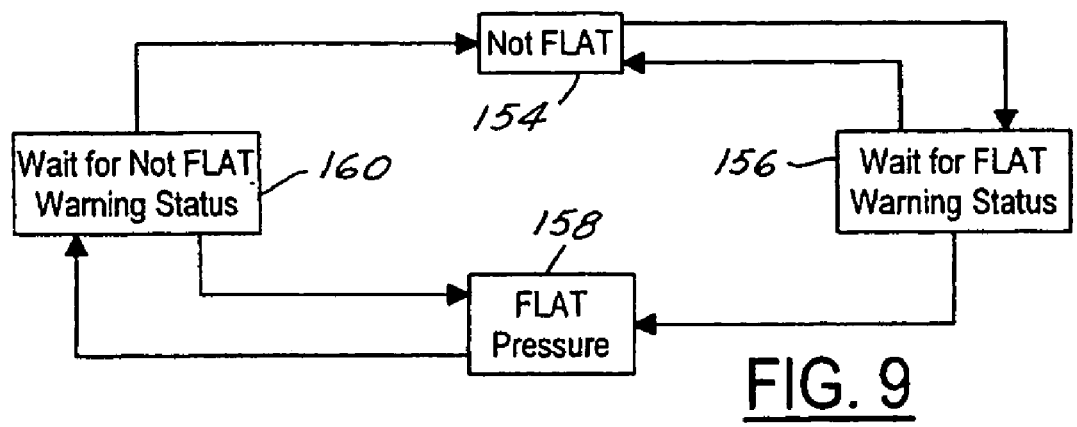
FIG. 9 is a state diagram of a flat pressure sensor status.

Referring now to FIG. 9, a state diagram for determining the presence of a flat tire is illustrated. When the warning status is not flat and the tire pressure for each tire falls below a predetermined flat threshold, then block 156 is executed. Again, the thresholds may be offset slightly to provide hysteresis. In block 56 if a subsequent pressure reading is greater than the flat threshold, then block 154 is again executed. In block 156, if the criteria for generating a flat warning status is met, as will be further described below, block 158 is executed. In block 158 when the pressure reading of a subsequent reading exceeds or is equal to a flat threshold, then block 160 is executed. Block 160 determines a not flat warning status in a similar manner to that of block 156. In block 160 if the subsequent readings drop below the flat warning threshold, then block 158 is again executed. In block 160 if the criteria for not flat warning status is met, then block 154 is executed.

Preferably, the processes shown in FIGS. 7, 8, and 9 are simultaneously performed for each wheel.

Referring now to FIG. 10, the results obtained from FIGS. 7, 8, and 9 are shown in respective columns. True in the columns refers to that pressure threshold being crossed. Thus, the output pressure status shown in the right hand column is "in range" when each of the pressure thresholds are not met. A flat pressure status refers to the flat pressure threshold being met. A low pressure status is obtained when a low pressure threshold is crossed, and a high pressure status when a high pressure threshold is exceeded.

Figure 11:
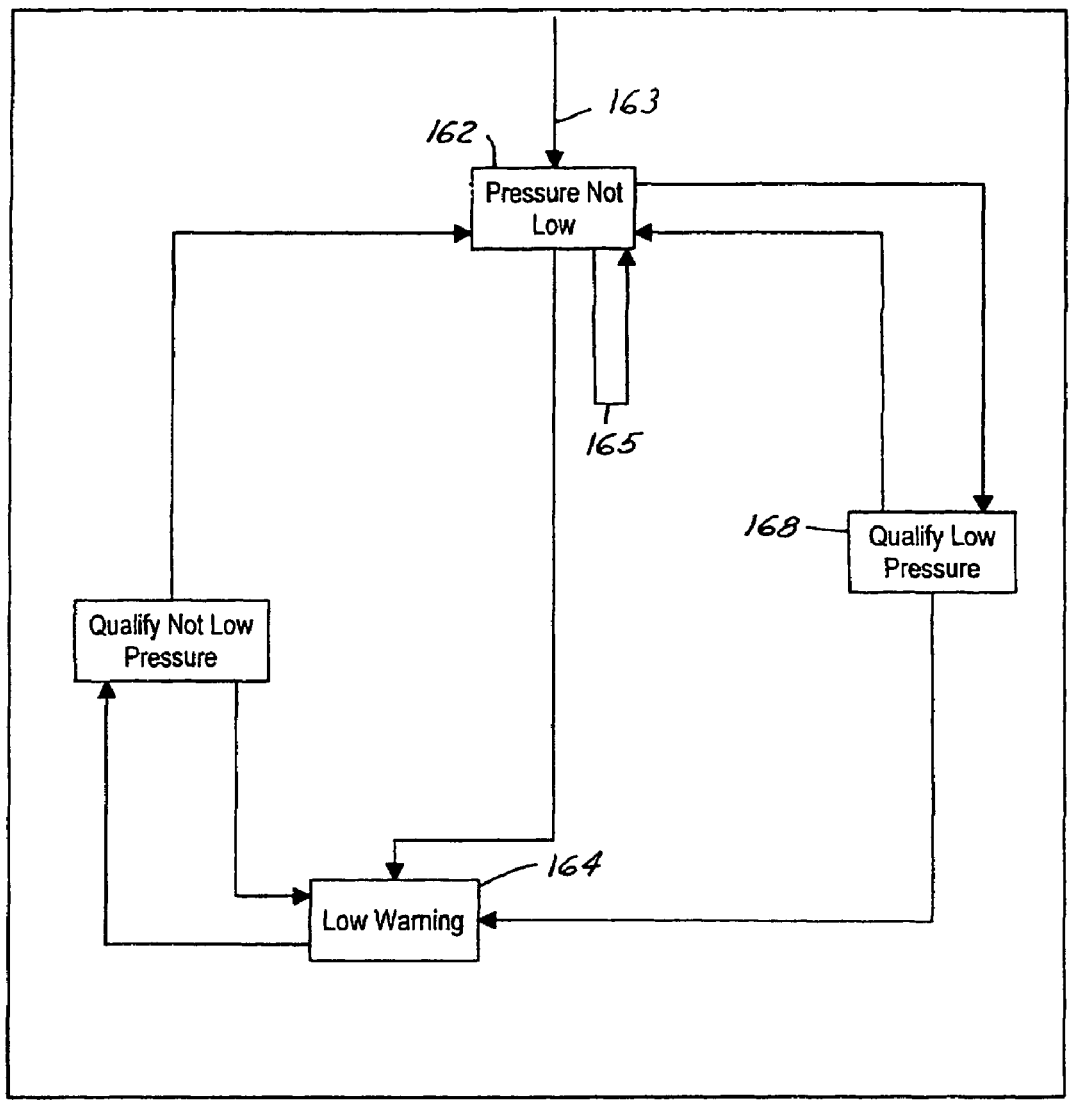
FIG. 11 is a state diagram of a low pressure warning status.

Referring now to FIG. 11, blocks 140 and 144 of FIG. 7 are illustrated in further detail. In each of these blocks the qualification process for either a pressure not low warning status or a low pressure warning status is illustrated. Upon an initial status reading the system is set to a false low warning status as indicated by arrow 163 and block 162 is executed. On the initial status reading, if a low pressure status is obtained in the first reading, block 164 is executed which immediately generates a low warning status. Thus, no waiting periods or other measurements are necessary from an initial standpoint. Loop 165 back to the pressure not low block 162 signifies that the initial value was in range and the status value is not an initial value. When the pressure status signal is low from FIG. 7, a warning qualification process is started in block 168. In block 168 if subsequent pressure status signals are not low, block 162 is executed. In block 168 if a predetermined number of pressure status signals are low or a certain number of pressure status signals over a fixed time period are low, for example five warning events, block 164 is executed. In block 164 when a not low pressure status is obtained a qualification timer is initiated in block 170. If a subsequent low pressure warning is received, then block 164 is again executed. In block 170 if a low warning qualification timer expires, the low warning status if false or "not low pressure" and block 162 is executed. The warning status is initiated as represented by arrow 163 by a wake message received from a spare and the vehicle speed is greater than three miles per hour and the low warning status indicates the tire pressure is not low.

Figure 12:
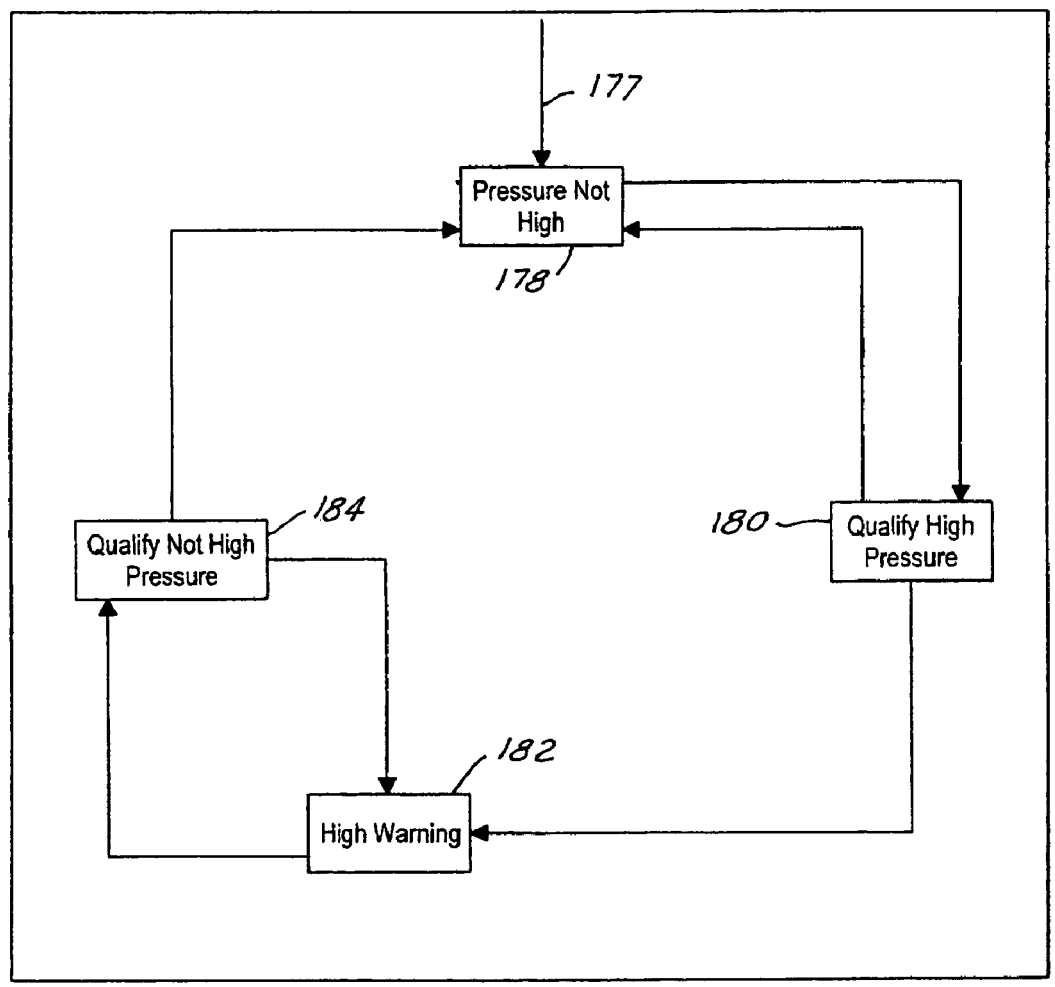
FIG. 12 is a state diagram of a high pressure warning status.

Referring now to FIG. 12, a state diagram of the qualification for generating a warning status for high pressure is illustrated. Once again, an initial step represented by arrow 177 is a default state in which the initial status is set to not high. In block 178 when the pressure sensor status is high, block 180 is executed in which the high pressure is qualified. In the transition from block 178 to 180 a high warning qualification process is initiated. As mentioned above in FIG. 11, the qualification may be a predetermined number of sequential pressure sensor status readings being high or a predetermined number of pressure sensor status readings being high over a predetermined time. In block 180 if a pressure status is not high before qualification, step 178 is re-executed. In block 180 if a predetermined of pressure sensor status readings are high, then a high warning status is generated in block 182. When a high warning status is generated, if a subsequent pressure status is not high then a qualification timer again starts in block 184. In block 184 if a subsequent pressure status is high then step 182 is executed. In step 184 the not high pressure is qualified before issuing a not high warning status. Thus, a predetermined number of not high pressure statuses must be received before qualification. When a predetermined number of not high pressures are obtained, step 178 is again executed.

Figure 13:
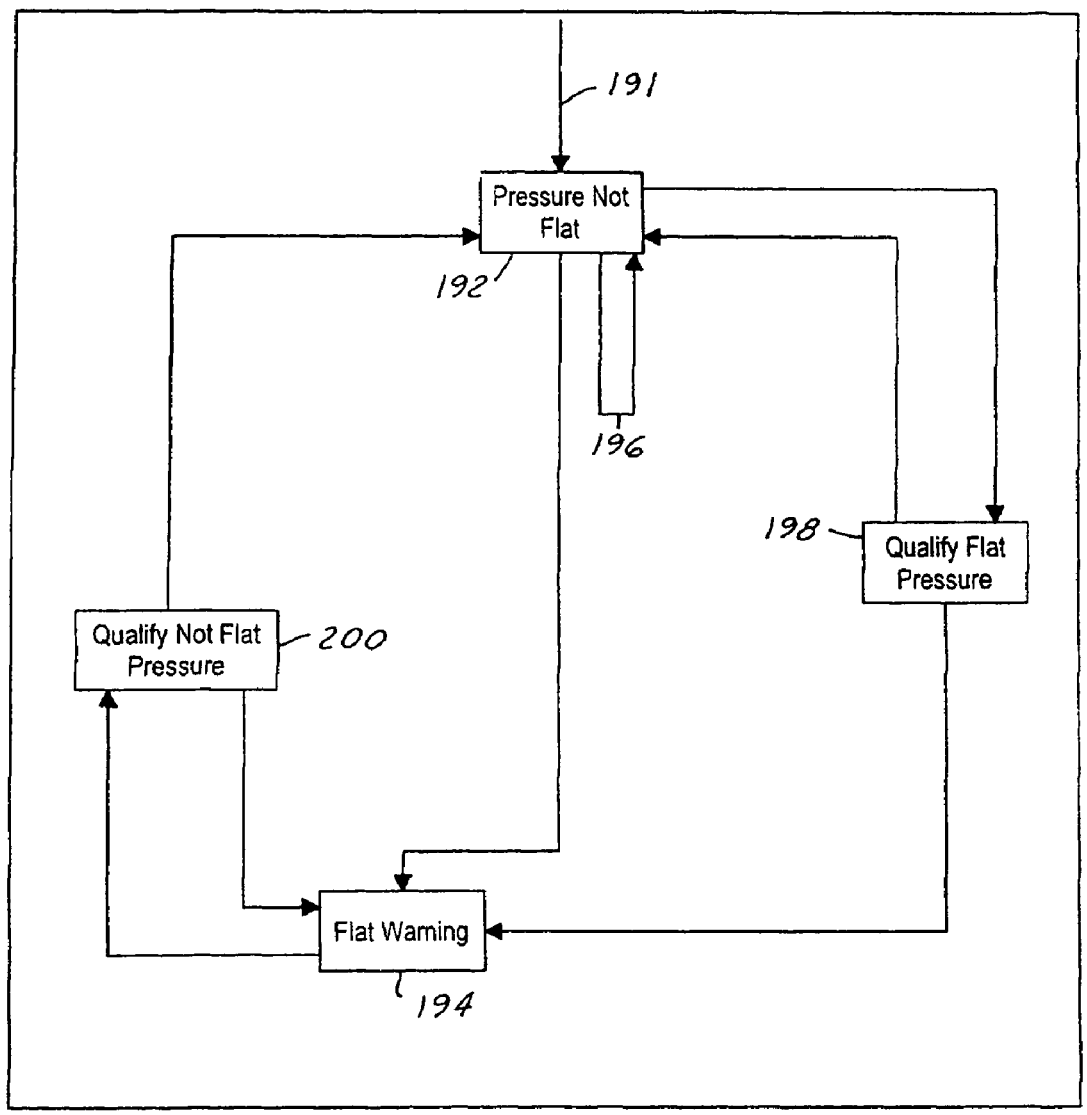
FIG. 13 is a state diagram of a flat pressure warning status.

Referring now to FIG. 13, a flat warning status is generated in a similar manner to the low warning status of FIG. 11. The difference between flat warning and low warning is the flat warning is a substantially lower pressure than the flat warning. This system also begins when a wake up message is received and the speed is greater than three miles per hour. Other considerations may also initiate the process. The default is illustrated by arrow 191. When the first pressure status reading is obtained and the pressure sensor status indicates a flat tire, a flat warning status of true is provided in block 194. Loop 196 resets the initial value flag to false after the initial status value is received. In block 192 if a subsequent sensor pressure status is flat, a qualification timer is initiated in block 198. In block 198 if a not flat sensor pressure status is received, block 192 is again executed. In block 198 if the qualification process has a predetermined number of flat warning events, either consecutively or during a time period, block 194 is executed. In block 194 if a not flat sensor pressure status is obtained a not flat pressure qualification process is initiated in block 200. In block 200 if a subsequent flat warning is received, block 194 is again executed. In block 200 if a predetermined number of not flat pressure statuses are provided, the flat warning status is not false, then block 192 is again executed.

As mentioned above in FIG. 6, the output of the warning status generators of FIGS. 11, 12, and 13 generate a composite warning status as illustrated by the following table.

TABLE

| Sensor Status | Flat Warning Status | Low Warning Status | High Warning Status | Composite Warning Status |
|---|---|---|---|---|
| Don't Care | TRUE | Don't Care | Don't Care | Flat |
| Don't Care | False | TRUE | Don't Care | Low |
| Don't Care | False | False | TRUE | High |
| Transmitter_Fau | False | False | False | Fault |
| In Range | False | False | False | In Range |

Thus, the composite warning status has an independent flat warning status portion, a high warning status portion, and a low warning status portion. Also, the composite warning may also include a sensor status portion to indicate a transmitter fault on behalf of the pressure sensor. In response to the composite warning status signal, the tire pressure monitoring system may provide some indication through the indicator such as a displayed word, a series of words, an indicator light or a text message that service or adjustment of the tire pressure may be required.

While particular embodiments of the invention have been shown and described, numerous variations and alternate embodiments will occur to those skilled in the art. Accordingly, it is intended that the invention be limited only in terms of the appended claims.

What is claimed is:

1. A pressure monitoring system for a tire of an automotive vehicle having a wheel comprising;
    a first pressure sensor coupled to said wheel;
    a pressure transmitter coupled to said pressure sensor, said transmitter generating a pressure signal;
    a controller coupled to said pressure transmitter, said controller receiving said pressure signal and in a first stage, comparing the pressure signal to a pressure threshold to obtain a sensor status and in a second stage, qualifying the sensor status signal by generating a composite warning status in response to said sensor status, wherein the composite warning status provides an in-range signal when the pressure statuses have not exceeded the pressure threshold and the pressure transmitters are not in a fault condition.

2. A system as recited in claim 1 wherein the sensor status signal is an initial pressure signal and wherein said controller qualifies the initial sensor status signal by generating a low or flat warning status signal in response to said initial sensor status signal indicating a respective low or flat tire pressure.

3. A system as recited in claim 2 wherein when the status signal is not an initial status signal, qualifying the sensor status signal by receiving a plurality of equal sensor status signals.

4. A method of operating a pressure monitoring system comprising:
    transmitting a pressure signal from a tire pressure sensor; and
    receiving said pressure signal in a controller;
    in a first stage, comparing the pressure signal to a pressure threshold to obtain a sensor status signal;
    in a second stage, qualifying the sensor status signal by generating a composite warning status in response to said sensor status, wherein the composite warning status provides an in-range signal when the pressure statuses have not exceeded the pressure threshold and the pressure sensors are not in a fault condition.

5. A method as recited in claim 4 wherein the sensor status signal is an initial sensor status signal and wherein qualifying the sensor status signal comprises generating a low warning status signal or flat warning status signal in response to said initial sensor status signal indicating a respective low tire pressure or flat tire pressure.

6. A method as recited in claim 5 wherein when the status signal is not an initial signal, qualifying the sensor status signal by receiving a plurality of equal sensor status signals.

7. A method as recited in claim 4 wherein the pressure threshold comprises a low pressure threshold, a high pressure threshold or a flat tire pressure threshold.

8. A method of operating a pressure monitoring system comprising:
    transmitting a plurality of pressure signals from a tire pressure sensor; and
    receiving said plurality of pressure signals in a controller;
    in a first stage, comparing the plurality of pressure signals to a pressure threshold to obtain a plurality of pressure status signals;
    in a second stage, determining a composite warning status signal in response to said plurality of pressure status signals, wherein the composite warning status combines a low pressure warning status a flat pressure warning status, a high pressure warning status, and a sensor status for each of the received pressure signals.

9. A method as recited in claim 8 wherein determining a warning status signal comprises qualifying the plurality of pressure status signals by generating the warning status signal in response to a predetermined number of said plurality of pressure status signal being equal.

10. A method as recited in claim 9 wherein said predetermined number is about 5.

11. A method as recited in claim 8 wherein said warning status comprises a high status or a not high status, a low status or a not low status, or a flat status or a not flat status.

12. A method as recited in claim 8 wherein determining a warning status signal comprises generating a first warning status signal in response to a predetermined number of said pressure status signals being equal within a predetermined time.

13. A method as recited in claim 8 further comprising generating an indication in response to said warning status signal.

14. A method as recited in claim 13 further wherein generating an indication comprises generating an audible signal or a visual signal.

15. A method of operating a pressure monitoring system comprising:
    transmitting a plurality of pressure signals from a tire pressure sensor;
    receiving said plurality of pressure signals in a controller;
    comparing the plurality of pressure signals to a plurality of pressure thresholds to obtain a pressure status signal;
    when the pressure status signal is above a high pressure threshold, generating a first high pressure warning status signal in response to said pressure status signal;
    when the pressure status signal is below a low pressure threshold, generating a first low pressure warning status signal in response to said pressure status signal;
    when the pressure status signal is below a flat pressure threshold, generating a first flat pressure warning status signal in response to said pressure status signal;
    determining a composite warning signal in response to said high pressure warning status signal, said low pressure warning status signal, and said flat pressure status signal, wherein the composite warning status combines the low pressure warning status, the flat pressure warning status, the high pressure warning status, and a sensor status for each of the received pressure signals.

16. A method as recited in claim 15 further comprising when the pressure status signal is below a low pressure threshold, generating a second low pressure warning status signal.

17. A method as recited in claim 16 further comprising when the pressure status signal is below a flat pressure threshold, generating a second flat pressure warning status signal.

18. A method as recited in claim 17 further comprising when the pressure status signal is above a high pressure threshold, generating a second high pressure warning status signal.

19. A method as recited in claim 18 wherein determining a composite warning signal comprises determining a composite warning signal in response to said first high pressure warning status signal, said second high pressure warning status signal, said first low pressure warning status signal, said second low pressure warning status signal, said first flat pressure status signal, and said second flat pressure status signal.

20. A method as recited in claim 19 wherein said composite signal comprises a sensor status signal.

* * * * *